April 12, 1949.  L. W. CHUBB, JR  2,467,293

POLARIZING HEADLIGHT SYSTEM

Filed Nov. 20, 1946

INVENTOR
Lewis W. Chubb, Jr.
BY
Donald C. Brown
and
Frank J. Novotny
Attorneys

Patented Apr. 12, 1949

2,467,293

UNITED STATES PATENT OFFICE 2,467,293

POLARIZING HEADLIGHT SYSTEM

Lewis W. Chubb, Jr., Sharon, Mass., assignor to Polaroid Corporation, Cambridge, Mass., a corporation of Delaware Application November 20, 1946, Serial No. 711,107

4 Claims. (Cl. 171—97)

This invention relates to a polarizing headlight system and, more particularly, embodies a conversion unit adapted for use as an auxiliary lighting source and designed primarily for automatic energization and de-energization.

Briefly, this invention includes automatic relay switching means for throwing into and out of circuit polarizing and ordinary headlight systems. Thus, the heavy electrical load necessitated by polarizing headlights is reduced to the lower wattage load demanded by traffic or down beam headlights automatically when the voltage in the battery and/or generator system falls below that at which the polarized headlights are designed to operate.

In connection with the development of antiglare headlight systems for motor vehicles, one of the principal problems has been the development and design of equipment embracing polarized light sources for use in cars already on the road. Such systems utilizing polarized light in any of its well-known forms together with an appropriate visor and/or visors form the specific subject matter of this disclosure.

In one of its broader aspects, the invention contemplates a source of polarized light comprising a pair of such light sources and automatic switching means effective upon energization of the polarized headlights and the concomitant dropping of the voltage source below that for which the polarized lamps are designed to operate for automatically de-energizing the polarized headlights and energizing the ordinary headlights which require a much lower wattage consumption for efficient road lighting. Thus, the original lamps on the car would be left unchanged and an auxiliary unit, readily mounted on a bumper, crossbar or similar unit at the front of the car, is added thereto. It is, moreover, to be noted that circuits and lighting equipment wherein a completely polarizing lighting headlight system comprising one, two or more polarizing lighting elements are adapted by appropriate circuits and auxiliary apparatus to effect a complete change of lighting from nonpolarized lighting to polarized lighting during the passing period are not to be excluded.

It is a major object of this invention to make possible the rapid and easy conversion of both old and new cars utilizing ordinary headlights for road lighting purposes to the more efficient polarizing light units.

It is a further object hereof to effect this conversion without rendering the ordinary headlights inoperative.

Another object is to make possible an extremely effective polarizing light unit at a very low cost.

Still another object is to provide a polarizing light source which will not result in an excessive drain on the electric system of a car not originally designed to carry an additional electrical load.

These objects will become further clarified upon reading the following description of examples embodying this invention, and other and similar objects will suggest themselves to those versed in the related art.

The improvements and advantages of the present invention are more readily appreciated when considered in conjunction with the appended drawing forming a part of this description in which.

In general, any use of polarized light results in a diminution of light intensity by slightly more than 50%. This light loss, while not serious during the passing or meeting of cars, is serious during driving on the open road. With new equipment as provided in new cars, such reduction in road and object lighting is readily avoided by the utilization of headlight bulbs of increased wattage, heavier wiring to carry the higher lighting load, larger generators, and the like.

However, cars already on the road are not adapted for the ready installation of such high wattage systems as may readily be ascertained by even a cursory examination of the electrical equipment now in use. Furthermore, for obvious reasons it is practically impossible to install larger generators in present-day units due to the larger size of the more powerful units, lack of interchangeability of new parts, excessive cost of new equipment, etc. In addition, the excessive drain on an old or marginal storage battery results in shortening its useful life period.

Still another problem encountered in connection with the use of polarizing headlights has arisen from the fact that even though high wattage lamps are used in such systems as a source of illumination, approximately one half of their effective illuminating power is cut out by the polarizing elements; and such inefficient operation of these light sources is continuously used even under conditions where headlight energization, particularly of polarized high wattage bulbs, is so excessive as to greatly accelerate the deterioration of a discharged or otherwise weakened battery.

The present system gives additional flexibility to road lighting effects possible for new cars equipped therewith and, furthermore, will be found to yield highly desirable results when used in connection with lighting systems already found on old cars.

Figure 1:
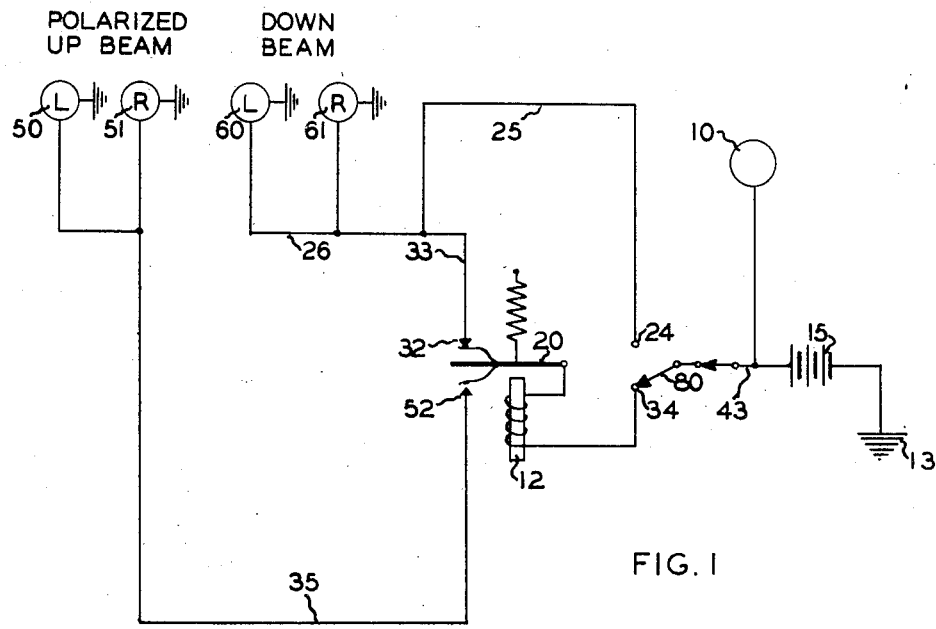
Figure 1 is a wiring diagram, partly schematic, of a conversion unit embodying the principle of this invention, showing the necessary apparatus connected for facile operation by means of manipulation by a conventional upper and lower beam foot switch.

Referring, now, in more detail to the drawing, wherein corresponding numbers indicate similar operative elements in all of the figures, 10, Fig. 1, is a schematically represented generator together with its automatic charging switch which automatically completes a circuit for charging storage battery 15 when the engine speed reaches a predetermined rate. This circuit is completed through ground 13 which forms a part of the generator housing. In the drawing, Fig. 1, the conventional dash panel switch is shown closed whereby a circuit is completed from battery 15 through a conductor 43, switch 80, contact 34, relay coil 12, relay armature 20, contact 32, conductors 33 and 26 to down beam headlights 60 and 61, energizing these particular traffic or down beam headlights.

If it is desired to maintain the down beam headlights on indefinitely, the alternative circuit from contact 24, conductor 25 to conductor 33 is selectively chosen by causing foot switch 80 to close with contact 24 whereby contact 34 (completing a circuit through the relay 12) is simultaneously broken.

With the circuit completed as shown in Fig. 1, if storage battery 15 is not sufficiently charged to cause relay 12 to overcome the spring bias of armature 20, the ordinary down beam headlights 60 and 61 will be left in circuit. Thus, it is obvious that with the present light-polarizing conversion system, a car equipped therewith is not deprived of the advantages found in the ordinary lighting systems as at present embodied in stock model cars. Moreover, by using the automatic relay switching means herein described there need be no concern over excessive power demands made upon the generator or battery system.

Figure 2:
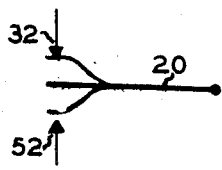
Figs. 2, 3 and 4 show the details of operation of the make-before-break relay incorporated in a preferred embodiment of the invention.
Figure 3:
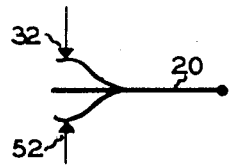
Figure 4:
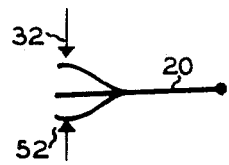

If with the circuit closed, as shown in Fig. 1, battery 15 is capable of supplying sufficient voltage for the effective energization of polarized up beam headlights 50 and 51, relay 12 builds up a sufficiently strong magnetic field to attract its armature 20 with a force sufficient to overcome the bias of the armature spring, whereupon the sequence of steps shown in Figs. 2, 3 and 4 is effected. The make-before-break sequence shown in the latter three figures is practically self-explanatory, i. e., relay armature 20 maintains the down beam circuit energized through contact 32 until, or shortly after armature 20 completes a circuit for energizing the polarized up beam headlights 50, 51 through the circuit including conductor 35 by closing with contact point 52, as shown in Fig. 3. The final position of armature 20 is shown in Fig. 4 where armature 20 has broken the circuit for energization of down beam headlights 60 and 61 at contact 32 while still maintaining the circuit for the polarized up beam headlights energized through contact 52.

In the preferred embodiment the pair of polarizing headlights comprising a right and a left polarizing headlight could conveniently be mounted on the bumper or on a specially adapted crossbar.

It is submitted that various other combinations of lighting elements are likewise possible and are all to be deemed as coming within the scope of this invention. Thus, for example, one polarizing headlight may be used in place of the two shown at 50, 51, Fig. 1.

Still other possible combinations are clearly within the scope of this disclosure and are readily suggested to those versed in the art upon cursorily examining the wiring diagram given in Fig. 1. Thus, the system is readily adapted for the use of at least one polarizing headlight in combination with at least one up beam headlight by the mere substitution of an up beam headlight for one of the polarizing headlights 50, 51 of Fig. 1. Such a system would provide more efficient illumination of the road for a greater distance in front of the driven vehicle as well as provide more intense illumination over a greater area than is possible with the headlight combination shown in Fig. 1.

With the preferred system it is obvious that the high drain on an electrical system necessitated by the continuous operation of high wattage (i. e., 80–100 watt lamps) polarizing headlights cannot seriously damage an already weakened battery by excessively draining or overdischarging the latter because the automatic cut-out effects a change in circuits, i. e., relay 12 operates to de-energize polarizing headlights 50, 51 and to energize two conventional 40 watt headlight bulbs such as are found in the down beam headlights 60, 61. Thus, when the polarizing headlight voltage drops significantly below that for which its high wattage lamps are designed to operate, the alternate lighting system utilizing the lower voltage to greater advantage is automatically switched into operative condition.

Furthermore, with this particular system a driver who happens to stop his car with the polarized up beam energized will automatically have the down beam headlights switched into condition for energization, particularly if his engine is stopped or if battery 15 is incapable of supplying the necessary voltage for the operation of relay 12 without the additional help of generator 10. Since the driver will not need a polarizing headlight system when the car is stopped, the particular device herein disclosed will greatly prolong the life of headlamp polarizer laminations which may otherwise be injured by the excessive heat radiated from the high wattage filaments used in headlamps 50, 51, particularly when not cooled by such air currents as accompany a car in motion.

It is also to be noted that with relay switch 12 connected as shown to the foot switch, whether or not the automatic switching means associated with armature 20 operates, the regular foot switch 80 is always capable of closing a circuit through contact 24 for the energization of down beam headlights 60 and 61.

Although electromagnetic switching means have been shown in great detail in the figures, it is submitted that it may be desirable under certain conditions to utilize mechanical means for switching from the polarizing headlight system to the ordinary headlighting system, the mechanical means being operated by centrifugal devices which in turn become effective upon the engine or generator reaching predetermined upper and lower limits of speed in terms of a preassigned number of revolutions per minute. All such arrangements are deemed to fall within the scope of this invention.

It is to be understood that although the system described in the specification has been given, more specifically for use with cars already on the road, it is equally applicable for use on new cars, forming a part of the original lighting system thereof.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. In a headlight system for automotive vehicles, in combination, means providing a first electrical circuit and including at least one polarizing headlight, means providing a second electrical circuit and including at least one nonpolarizing headlight, a source of current providing a fluctuating voltage and comprising a battery for lighting said headlights, and switch means automatically responsive to the voltage supplied by said lighting means for connecting said lighting means with said first circuit and disconnecting said lighting means from said second circuit whenever said voltage exceeds a predetermined minimum and for connecting said lighting means with said second circuit and disconnecting said lighting means from said first circuit whenever said voltage falls below said minimum.

2. In a headlight system for automotive vehicles, in combination, means providing a first electrical circuit and including at least one polarizing headlight, means providing a second electrical circuit and including at least one nonpolarizing headlight, a source of current providing a fluctuating voltage and comprising a battery for lighting said headlights, switch means automatically responsive to the voltage supplied by said lighting means for connecting said lighting means with said first circuit and disconnecting said lighting means from said second circuit whenever said voltage exceeds a predetermined minimum and for connecting said lighting means with said second circuit and disconnecting said lighting means from said first circuit whenever said voltage falls below said minimum, and additional manually operable switch means for disconnecting said lighting means from said first circuit and said first-mentioned switch and connecting said lighting means with said second circuit.

3. In a headlight system for automotive vehicles, in combination, means providing a first electrical circuit and including at least one polarizing headlight, means providing a second electrical circuit and including at least one nonpolarizing headlight, a source of current providing a fluctuating voltage and comprising a battery and a battery-charging generator for lighting said headlights, and switch means automatically responsive to the voltage supplied by said lighting means for connecting said lighting means with said first circuit and disconnecting said lighting means from said second circuit whenever said voltage exceeds a predetermined minimum and for connecting said lighting means with said second circuit and disconnecting said lighting means from said first circuit whenever said voltage falls below said minimum.

4. In a headlight system for automotive vehicles, in combination, means providing a first electrical circuit and including at least one polarizing headlight, means providing a second electrical circuit and including at least one nonpolarizing headlight, means providing a fluctuating voltage for lighting said headlights and comprising a battery and a battery-charging generator driven by the motor of said vehicle, the output of the generator being responsive to the motor speed, and switch means automatically responsive to the voltage supplied by said lighting means for connecting said lighting means with said second circuit and disconnecting said lighting means from said first circuit whenever said voltage is less than a predetermined minimum in excess of the voltage supplied by said battery alone, said switch connecting said lighting means with said first circuit and disconnecting said lighting means from said second circuit whenever the voltage supplied by said battery and generator exceeds said predetermined minimum.

LEWIS W. CHUBB, Jr.

REFERENCES CITED

The following references are of record in the file of this patent:

UNITED STATES PATENTS

| Number | Name | Date |
|---|---|---|
| 1,592,322 | Adams | July 13, 1926 |
| 1,925,200 | Miller | Sept. 5, 1933 |
| 1,956,980 | Cook | May 1, 1934 |
| 2,302,086 | Zierdt, Jr. | Nov. 17, 1942 |